United States Patent
Russell et al.

(10) Patent No.: US 10,434,829 B2
(45) Date of Patent: Oct. 8, 2019

(54) ROPE SHACKLE ATTACHMENT THIMBLE

(71) Applicant: Omix-Ada, Inc., Suwanee, GA (US)

(72) Inventors: Eric Russell, Stone Mountain, GA (US); Patrick W. Bennett, Gainesville, GA (US)

(73) Assignee: Omix-Ada, Inc., Suwanee, GA (US)

( * ) Notice: Subject to any disclaimer, the term of this patent is extended or adjusted under 35 U.S.C. 154(b) by 100 days.

(21) Appl. No.: 15/798,000

(22) Filed: Oct. 30, 2017

(65) Prior Publication Data
US 2019/0126698 A1    May 2, 2019

(51) Int. Cl.
*B60D 1/18* (2006.01)
*F16G 15/06* (2006.01)
*B60D 1/58* (2006.01)
*F16G 9/00* (2006.01)

(52) U.S. Cl.
CPC .............. *B60D 1/187* (2013.01); *B60D 1/58* (2013.01); *F16G 15/06* (2013.01); *F16G 9/00* (2013.01)

(58) Field of Classification Search
CPC ......... B60D 1/187; F16G 15/06; F16G 15/04; F16G 9/00
See application file for complete search history.

(56) References Cited

U.S. PATENT DOCUMENTS

| | | | |
|---|---|---|---|
| 2,561,371 A | 7/1951 | Hill | |
| 2,877,621 A * | 3/1959 | Robbins | F16G 15/04 59/88 |
| 4,145,874 A * | 3/1979 | Muller | F16G 15/06 59/86 |
| 5,046,881 A * | 9/1991 | Swager | F16D 25/082 403/154 |
| 5,647,198 A * | 7/1997 | Mihailovic | B63H 9/10 59/86 |
| 6,023,927 A * | 2/2000 | Epstein | F16G 15/06 59/85 |
| 6,158,760 A | 12/2000 | Kiss | |
| 6,698,256 B2 * | 3/2004 | Witchey | B60D 1/02 280/507 |

(Continued)

OTHER PUBLICATIONS

Photographs 1-4.

*Primary Examiner* — Joseph M Rocca
*Assistant Examiner* — Michael R Stabley
(74) *Attorney, Agent, or Firm* — The Dobrusin Law Firm, P.C.; Daniel P. Aleksynas

(57) ABSTRACT

An attachment thimble is disclosed for attaching a rope shackle to a vehicle for towing, pulling, or other tasks. In one embodiment, the attachment thimble has spaced apart flanges and a mid-portion with a diameter less than the dimensions of the flanges. A through-bore is formed through the thimble from one flange to the other flange. The thimble is sized to be slid into a hitch receiver or disposed between mounting dogs of a D-ring mount. In one application, a rope shackle is formed into a loop by pressing the knot on one end of the shackle through the eyelet on the other end. The thimble is then disposed in the loop and the knot, eyelet, and thimble are slid into the hitch receiver of a vehicle until its through-bore aligns with holes in the receiver. A securement pin is then slid through the receiver and through the thimble to secure the rope shackle to the hitch receiver for use.

20 Claims, 2 Drawing Sheets

(56) References Cited

U.S. PATENT DOCUMENTS

| | | | |
|---|---|---|---|
| 7,871,097 B2 * | 1/2011 | Sparkes | B60D 1/00 280/480 |
| D657,234 S * | 4/2012 | Herman | F16G 11/14 D8/382 |
| 8,205,922 B1 | 6/2012 | Ohman, Jr. | |
| 8,322,003 B2 | 12/2012 | Petzl et al. | |
| 8,328,223 B2 | 12/2012 | Leinenger | |
| 8,641,076 B2 * | 2/2014 | Sparkes | B60D 1/00 280/480 |
| 9,388,025 B2 * | 7/2016 | Costa | B66D 1/00 |
| 9,726,255 B1 * | 8/2017 | Tarrant | F16G 15/06 |
| D826,036 S * | 8/2018 | Worswick | F16G 11/14 D8/383 |
| 2004/0194259 A1 | 10/2004 | Tylaska et al. | |
| 2012/0280523 A1 | 11/2012 | Costa | |
| 2017/0334533 A1 * | 11/2017 | Herman | B63H 9/10 |

* cited by examiner

ROPE SHACKLE ATTACHMENT THIMBLE

TECHNICAL FIELD

This disclosure relates generally to shackles commonly used on off-road vehicles for attaching chains, cable, and rope to the vehicle. More specifically, the disclosure relates to soft shackles made of rope, known as rope shackles, and to devices for securing rope shackles to a vehicle.

BACKGROUND

Shackles have long been used in automotive, marine, aviation, and other fields to attach chains, cables, and ropes to a vehicle. One traditional shackle is a metal loop, usually U-shaped, closed by a bolt or pin that secures the shackle to a pair of mounting dogs on a vehicle. Metal shackles, while effective, carry certain inherent shortcomings. For example, they are heavy and tend to rattle and clank around on a vehicle when not in use, which is the majority of the time. They are also cumbersome to store when removed from the vehicle.

More recently, shackles made of a length of very strong rope have become popular and are generally referred to as rope shackles. A rope shackle generally comprises a relatively short length of rope with a tight knot at one end and an eyelet formed at the other. The length of rope can be threaded through an attachment structure on a vehicle and the knot pressed through the eyelet to form a loop. Other towing devices such as recovery ropes for instance, chains, or cables can be attached to the looped rope shackle. Rope shackles are a fraction of the weight of a traditional metal shackle, do not rattle when not in use, can be far more economical than metal shackles, and are convenient to store when not attached. Further, the breaking strength of rope shackles made of modern high strength fibers can exceed that of metal shackles of a corresponding size.

One issue faced by users of rope shackles is how best to attach them to various structures of a vehicle in such a way that they retain their integrity and strength but can be removed easily if desired. Metal shackles are attached with shackle pins that extend through the shackle and through aligned holes in mounting structures on a vehicle. They are removed by simply removing the shackle pin. Shackle pins also can be used to attach rope shackles, but this creates a very tight bend in the rope when a pulling force is applied, which can cause stress and breakage. Many users such as off-road vehicle drivers find themselves attaching a rope shackle to a traditional metal shackle, which defeats much of the advantage of rope shackles in the first place. Plus, locations on the vehicle to which the rope shackle can be attached generally are limited to the mounting positions for traditional shackles or metal D-rings.

A need exists for a method and device usable to attach a rope shackle to a vehicle in a safe and simple way, to allow its easy removal when desired, to provide for attachment locations in addition to the traditional D-ring mounting structures, and to reduce physical stress in the rope. It is to the provision of such a method and apparatus that the present invention is primarily directed.

SUMMARY

Briefly described, an attachment thimble is disclosed for attaching a rope shackle to a vehicle. The attachment thimble has a one-piece preferably metal and most preferably aluminum body shaped with a smaller central portion that tapers outwardly to larger end portions or flanges. In one embodiment, the body bears a slight resemblance to a thimble. A through-bore extends through the body of the attachment thimble from one end portion to the other end portion. The through-bore is sized to receive a heavy duty pin such as a metal securement pin. In one embodiment, the attachment thimble is sized to slide into the trailer hitch receiver on the back of a vehicle and be secured in the receiver by a securement pin that extends through the receiver and through the hole in the attachment thimble. In use, a rope shackle is extended around the smaller central portion of the thimble and locked into a loop. The attachment thimble is then slid into the end of the hitch receiver of the vehicle until its through-bore aligns with holes on either side of the hitch receiver. A securement pin is inserted through the receiver and through the attachment thimble to lock the thimble and the rope shackle in place. The rope shackle can then be used as needed to attach recovery ropes, chains, cables, or other items to the back of the vehicle.

In another embodiment, the attachment thimble is sized to be inserted between two mounting dogs to which a traditional metal D-ring shackle can be mounted. A bolt or pin can then be passed through one mounting dog, through the hole in the attachment thimble, and through the other mounting dog before being secured with a nut, spring clip, or cotter pin. A rope shackle can then be treaded behind the thimble and locked into a loop for attaching recovery ropes, chains, cables and other items to the vehicle. Regardless of the embodiment, the attachment thimble is easily and quickly removable and conveniently storable when necessary simply by removing the securing pin and pulling out the attachment thimble. Its shape avoids tight bends in the rope of the shackle thus reducing stress and the chance of breakage.

Thus, a method and device is now provided that meets the above identified and other needs that exist when using rope shackles on vehicles. These and other aspects, features, and advantages will be better appreciated upon review of the detailed description set forth below taken in conjunction with the accompanying drawing figures, which are briefly described as follows.

DETAILED DESCRIPTION

Figure 1:
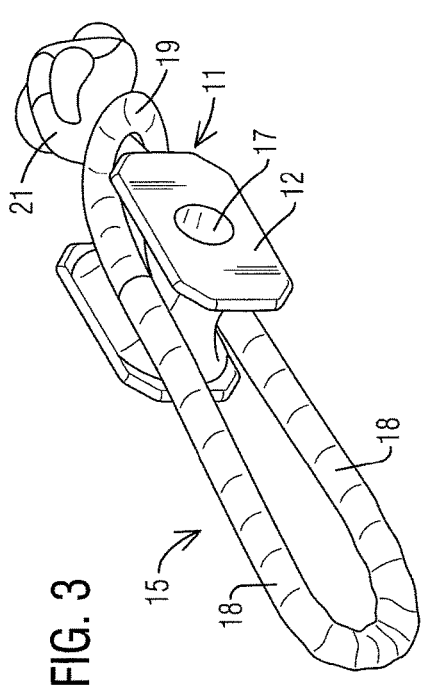
FIG. 1 is a perspective view of one embodiment of a rope shackle attachment thimble according to principles of the invention.

The invention will now be described in more detail with reference to the various drawing figures, wherein like reference numerals identify like parts throughout the views. FIG. 1 shows a rope shackle attachment thimble 11 according to one embodiment of the invention. The thimble 11 has a first flange 12 on one end and a second flange 13 on the opposite end. The outside faces of the flanges are generally flat. A drum portion 14 of the thimble extends between the first and second flanges 12 and 13. The drum portion 14 tapers inwardly from each flange as indicated at 16 to a smaller diameter mid-portion between the flanges. The diameter of the mid-portion is sufficiently smaller than the dimensions of the flanges to allow a rope to extend around the mid-portion and not project outwardly beyond the outer edges of the flanges. A through-bore 17 is formed through the thimble 11 and extends from the first flange 12, through the mid-portion 14, and through the second flange 13 as shown. The through-bore has a diameter that is sufficient to receive a securement pin as described in more detail below.

Figure 2:
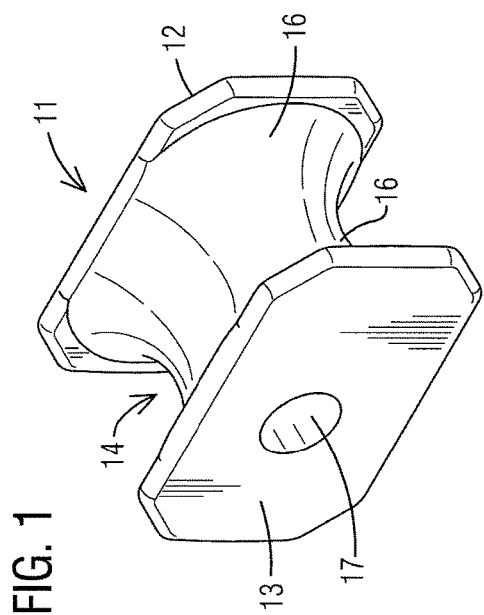
FIG. 2 is a perspective view showing use of the rope shackle attachment thimble to secure a rope shackle to a hitch receiver of a vehicle.

FIG. 2 shows the thimble 11 being used to anchor a rope shackle to the trailer hitch receiver 22 of a vehicle. The rope shackle 15 is made of a length of rope 18 having an eyelet 19 formed at one end and a knot formed at the opposite end. The knot 21 can be pressed through the eyelet 19 to form the length of rope 18 into a loop. When the rope is pulled tight, the knot locks tight such that it does not slip out of the eyelet. Items such as recovery ropes, chains, or cables can then be attached to the looped rope shackle for use in pulling or other tasks. In FIG. 2, the rope shackle 15 has been formed into a loop and the attachment thimble 11 of this invention has been inserted into the loop. The knot 21, eyelet 19, and the thimble 11 are them moved into the opening 26 of the hitch receiver 22 as indicated by arrow 20.

The thimble 11 is sized so that it fits within the opening 26 of the hitch receiver and slides therein with ease. The knot 21 and eyelet 19 are slid into the receiver ahead of the thimble 11 and all are moved into the receiver until the through-bore 12 in the thimble aligns with the holes 24 in each side wall of the receiver. When the through-bore and holes are aligned, a securement pin 23 is inserted through one hole 24, through the through-bore 17, and through the aligned opposite hole 24 (not visible in FIG. 2) in the other side wall of the receiver.

A spring pin can then be inserted through a hole 27 in the protruding end of the securement pin 23 to lock the securement pin securely in place. When this process is complete, the rope shackle 15 is securely held within the hitch receiver by the thimble. Further, the confined space in the receiver behind the thimble ensures that the knot 21 cannot slip out of the eyelet 19 when the rope shackle is under strain. The looped end of the rope shackle projects rearwardly from the hitch receiver where it is available to be attached to recovery ropes or other items.

Figure 3:
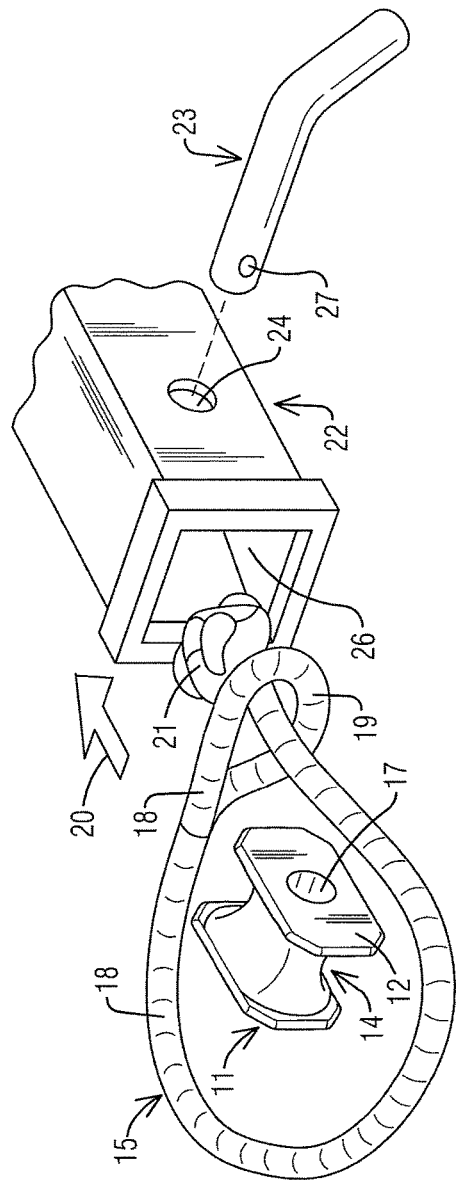
FIG. 3 is a perspective view showing a rope shackle extended around the rope shackle attachment thimble.

FIG. 3 illustrates a typical rope shackle formed into a loop and extending around an attachment thimble according to the invention. The rope shackle 15 is formed from a length of rope 18 (which is covered with a protective sheath in this figure) with an eyelet 19 formed at one end and a knot formed at the other end. The knot 21 is pressed through the eyelet 19 and the rope 18 is pulled tight to lock the knot behind the eyelet. The rope 18 extends from the knot 21 and eyelet 19 around the mid-portion of attachment thimble 11. As mentioned, the diameter of the mid-portion is small enough to allow the rope to extend around the mid-portion of the thimble without projecting beyond the outer edges of the flanges of the thimble 11. In this configuration, the knot 21, eyelet 19, and attachment thimble 11 can all be slid together into a hitch receiver and secured as described above.

Figure 4:
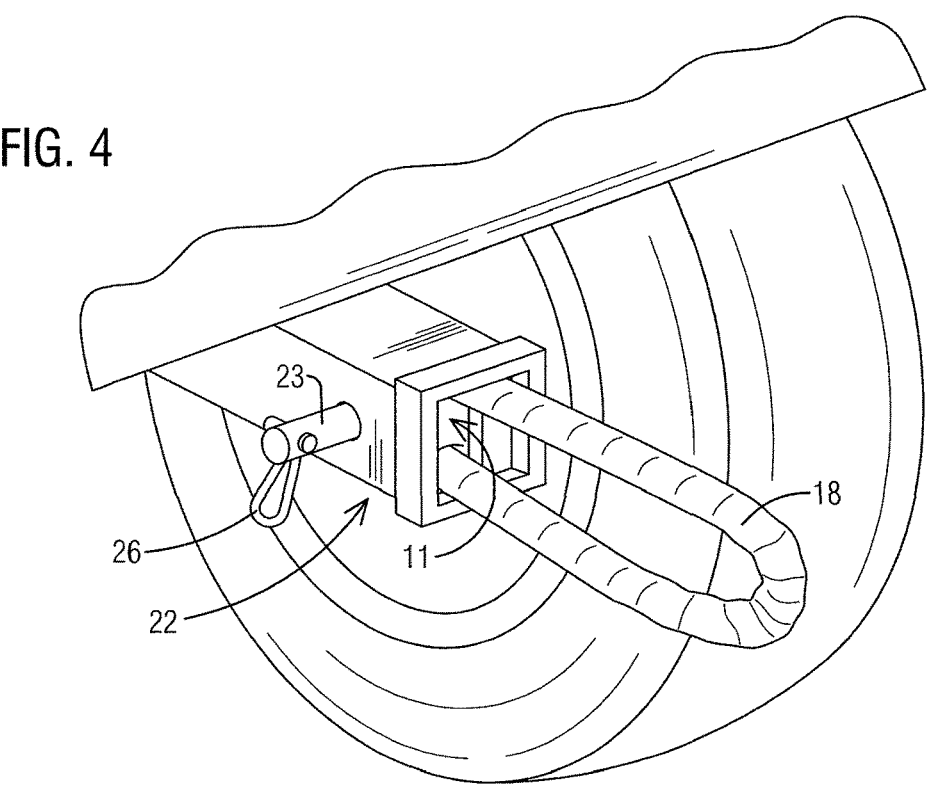
FIG. 4 is a perspective view showing a rope shackle secured within the hitch receiver of a vehicle with an attachment thimble that embodies the invention.
Figure 5:
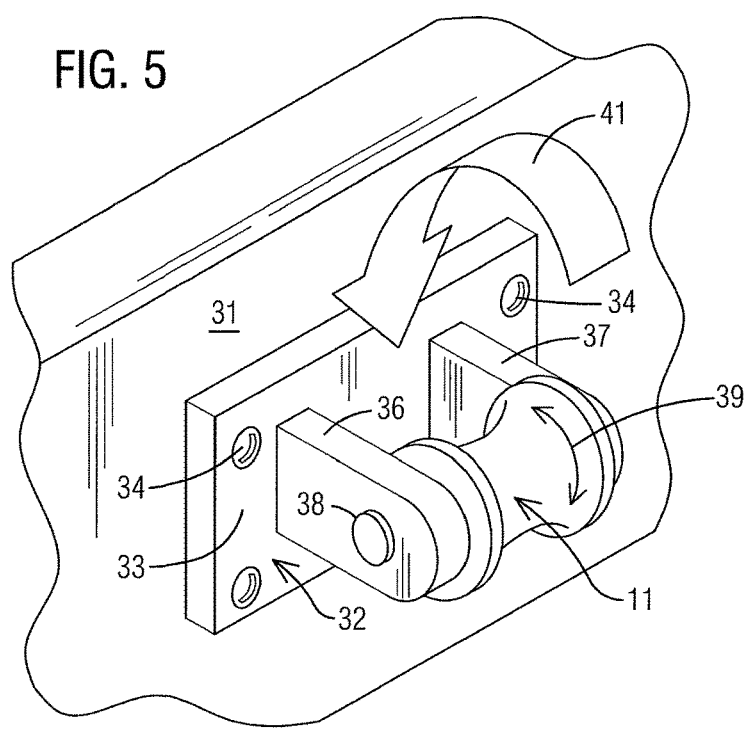
FIG. 5 is a perspective view of another embodiment of a rope shackle attachment thimble attached to the D-ring mounts on the bumper of a vehicle.

FIG. 4 shows a rope shackle after having been secured in a hitch receiver. The looped end of the rope 18 is seen projecting from the opening of the hitch receiver for attachment to a rope, cable, chain, or other item. The attachment thimble 11 can be seen recessed into the hitch receiver. A securement pin 23 has been inserted through the hitch receiver and attachment thimble and has been secured with a pin 26. The rope shackle is thereby locked securely in the hitch receiver. To remove the rope shackle, the securement pin 23 is removed and the shackle and attachment thimble is pulled out of the hitch receiver. The light weight and flexibility of the rope shackle make it much more convenient to store than a metal tow hook or trailer hitch until it is needed again. Alternatively, the recess between the end of the hitch receiver and the attachment thimble can be sufficiently deep to allow the looped end of the rope shackle to be wadded up and stowed within the recess until needed.

The invention is not limited to an attachment thimble for use with a hitch receiver. FIG. 4 shows an alternate embodiment of an attachment thimble for use with a D-ring mounting structure on a bumper of a vehicle. The bumper 31, which may be a front bumper or a rear bumper, has secured thereon a mounting structure 32 commonly used to mount a metal D-ring. In this case, the mounting structure 32 is secured with bolts that extend through bolt holes 34 in the base 33 of the structure, but it might also be welded or otherwise attached to the bumper. Spaced apart mounting dogs 36 and 37 extend away from the base 33 and each has a hole extending therethrough. The holes are aligned with each other. Typically, a metal D-ring is mounted to the mounting dogs with a threaded pin as is known in the art.

In this embodiment, an attachment thimble 11 according to the present invention is disposed between the mounting dogs 36 and 37. A securement pin 38 extends through the aligned holes in the mounting dogs and through the through-hole in the attachment thimble. Preferably, the securement pin 38 is slightly smaller than the through-hole so that the thimble is able to rotate while attached, as indicated by arrow 39. A rope shackle can be attached to the assembly by threading one end of the length of rope around the back of the thimble as indicated by arrow 41. The rope shackle can then be formed into a loop and its knot pressed through its eyelet to secure the rope shackle in place. The rope shackle is then available for use in towing or other tasks.

The attachment thimble of this invention can be made of any appropriate material such as steel, carbon fiber, or plastic. However, the preferable material is aluminum because of its light weight, strength, cost, and durability.

The invention has been described herein in terms of preferred embodiments and methodologies considered by the inventors to represent the best modes of carrying out the invention. It will be clear to the skilled artisan, however, that a wide gamut of additions, deletions, and modifications, both subtle and gross, might be made to the illustrated exemplary embodiments without departing from the spirit and scope of the invention, which is delineated only by the claims.

What is claimed is:

1. A method of attaching a rope shackle to a structure comprising the steps of:
    (a) extending a rope shackle around an attachment thimble;
    (b) securing one end of the rope shackle to an opposite end of the rope shackle to form a loop around the attachment thimble;
    (c) sliding one end of the loop and the attachment thimble between a pair of spaced apart structures that are spaced apart walls of a hitch receiver; and
    (d) securing the attachment thimble in place between the pair of spaced apart structures to attach the rope shackle.

2. A method of attaching a rope shackle to a structure as claimed in claim 1 wherein step (b) comprises pressing a knot on the one end of the rope shackle through an eyelet on the opposite end of the rope shackle.

3. A method of attaching a rope shackle to a structure as claimed in claim 1 wherein step (d) comprises extending a securement pin through aligned holes in the spaced apart walls of the hitch receiver and through a through-bore in the attachment thimble and securing the securement pin in place.

4. A method of attaching a rope shackle to a structure as claimed in claim 3 wherein the step of securing the pin in place comprises attaching a clip to a protruding end of the pin.

5. A method of attaching a rope shackle to a structure as claimed in claim 1 wherein step (d) occurs before step (a).

6. A method of attaching a rope shackle to a structure comprising the steps of:
  (a) extending a rope shackle around an attachment thimble
  (b) securing one end of the rope shackle to an opposite end of the rope shackle to form a loop around the attachment thimble;
  (c) sliding one end of the loop and the attachment thimble between a pair of spaced apart structures; and
  (d) securing the attachment thimble in place between the pair of spaced apart structures to attach the rope shackle; and
  wherein step (c) comprises sliding the attachment thimble between a pair of spaced apart mounting dogs.

7. A method of attaching a rope shackle to a structure as claimed in claim 6 wherein step (d) comprises extending a securement pin through aligned holes in the mounting dogs and through a through-bore in the attachment thimble.

8. A method of attaching a rope shackle to a structure as claimed in claim 7 further comprising allowing the attachment thimble to rotate on the securement pin.

9. A method of attaching a rope shackle to a structure as claimed in claim 6 wherein the pair of mounting dogs are part of a D-ring mounting structure.

10. A method of attaching a rope shackle to a structure as claimed in claim 9 wherein the D-ring mounting structure is secured to a bumper of a vehicle.

11. A method of attaching a rope shackle to a structure as claimed in claim 6 wherein step (d) occurs before step (a).

12. An attachment thimble for attaching a rope shackle to a structure, the attachment thimble comprising:
  a pair of spaced apart flanges and
  a mid-portion extending between the pair spaced apart flanges, the mid-portion having a minimum diameter smaller than outer dimensions of the pair of spaced apart flanges;
  wherein a width of the attachment thimble is selected to fit between a pair of spaced apart structures and the pair of spaced apart structures comprise spaced apart walls of a hitch receiver; wherein the rope shackle extends around the attachment thimble.

13. The attachment thimble of claim 12 wherein the mid-portion tapers inwardly from the pair of spaced apart flanges to the minimum diameter.

14. The attachment thimble of claim 12 further comprising a through-bore extending through the attachment thimble from one flange to the other flange.

15. The attachment thimble of claim 12 wherein the flanges are generally rectangular in shape.

16. The attachment thimble of claim 12 wherein the opposed walls of the vehicle hitch receiver are mounting dogs of a D-ring mount.

17. A rope shackle assembly comprising:
  a pair of spaced apart structures each having a hole aligned with a hole of the other spaced apart structure, the pair of spaced apart structures comprising opposed walls of a vehicle hitch receiver;
  an attachment thimble having end portions and a mid-portion and being disposed between the pair of spaced apart structures, the attachment thimble having a throughbore aligned with the holes of the spaced apart structures;
  a securement pin extending through the holes in the pair of spaced apart structures and through the through-bore in the attachment thimble; and
  a looped rope shackle extending around the attachment thimble and extending therefrom to a free looped end.

18. A rope shackle assembly as claimed in claim 17 wherein the mid-portion of the attachment thimble has a diameter smaller than dimensions of the end portions.

19. A rope shackle assembly as claimed in claim 17 wherein the opposed walls of the vehicle hitch receiver are mounting dogs of a D-ring mount.

20. A rope shackle assembly as claimed in claim 19, wherein the D-ring mounting structure is secured to a bumper of a vehicle.

* * * * *